No. 685,397. Patented Oct. 29, 1901.
S. B. DONCHIAN.
GLOVE OR DRESS FASTENER.
(Application filed June 10, 1901.)
(No Model.)

Witnesses:
Arthur B. Jenkins
Orma P. Coffrin

Inventor:
Samuel B. Donchian
by Chas. L. Burdett
Attorney

THE NORRIS PETERS CO., PHOTO-LITHO., WASHINGTON, D. C.

UNITED STATES PATENT OFFICE.

SAMUEL B. DONCHIAN, OF HARTFORD, CONNECTICUT.

GLOVE OR DRESS FASTENER.

SPECIFICATION forming part of Letters Patent No. 685,397, dated October 29, 1901.

Application filed June 10, 1901. Serial No. 63,831. (No model.)

*To all whom it may concern:*

Be it known that I, SAMUEL B. DONCHIAN, a citizen of the United States, and a resident of Hartford, in the county of Hartford and State of Connecticut, have invented certain new and useful Improvements in Glove or Dress Fasteners, of which the following is a full, clear, and exact description, whereby any one skilled in the art can make and use the same.

My invention relates to the class of devices used for the purpose of temporarily uniting the meeting or overlapping edges of articles of apparel, as a dress-skirt and a waist, or for securing in like manner the meeting parts of a glove.

The object of my invention is to provide a fastening device of this class for general use and one in which the two separable members will resist any force thrown upon the two parts and tending to disengage them, except such force or strain be exerted substantially in the line of the axis of the fastening.

Figure 1:
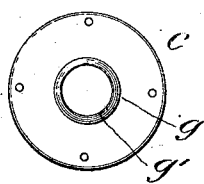
Figure 2:
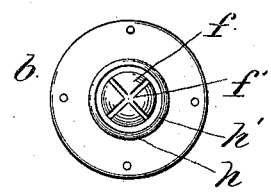
Figure 3:
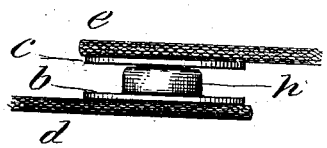
Figure 4:
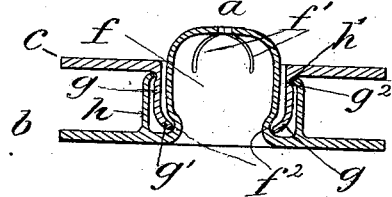

Referring to the drawings which form part hereof, Figure 1 is a plan view of the working face of one of the fastener members. Fig. 2 is a plan view of the working face of the complementary fastener member. Fig. 3 is a side view of the fastener as attached to two separate parts of a garment and united. Fig. 4 is a detail view, in central section, of the fastener on enlarged scale and illustrating the construction.

In the accompanying drawings the letter $a$ denotes the fastener as a whole, which is composed of two main parts or members $b$ and $c$, adapted to be attached, respectively, to the parts $d$ and $e$ of a garment, of an article of apparel, or other parts to be detachably fastened together. Each of these fastener members $b$ and $c$ is provided on the adjacent surfaces with projections which interengage and hold each other with a yielding grasp. Broadly stated, such features in a two-part fastener are not new; but a serious defect in those prior to my invention has been the ease with which a strain on the fastener parts in a plane at but a slight angle to the surface of the base tilts and unfastens the device. My invention obviates this defect.

On one of the fastener members $b$ there is a projection $f$, which is preferably bulbous in shape and of less diameter at its base than above it, thus providing a recess $f^2$, into which the outer edge of a socket part $g$, the walls of which project from the opposite fastener member, may fit. The projection $f$ is compressible to a degree, being made so preferably by the slits $f'$, which enter for almost half the depth of the projection, which is made of a resilient material. The walls of the socket part $g$ are high enough to fit over the projection $f$, and the edge $g'$ is inturned, so as to fit snugly into the recess $f^2$, the body part of the spring member $f$ yielding inward to permit this edge $g'$ to pass over it.

On the fastener member which supports the projection $f$ (the spring member) there is an annular guard $h$, secured to the base of the part, and this guard embraces the annular projection $g$ on the socket member of the fastener and prevents the disengagement of the two fastener members by any strain except in the direction of the axis of the fastener—that is, in a line normal to the plane of the base of the fastener. This guard has the edge $h'$ slightly inturned and is of a diameter to closely embrace the wall of the socket, at the bottom of which a recess $g^2$ is located. This edge $h'$ springs into the recess $g^2$ and holds its place with a yielding grasp.

From an examination of Fig. 4 of the drawings it will be seen that when the socket member $c$ and the spring member $f$ of the fastener are engaged the edge $g'$ of the wall of the socket part is located in the recess $f^2$ at the base of the projection, and the edge $h'$ of the guard $h$ lies in the recess $g^2$ at the base of the wall of the socket part. The guard so located opposes any force applied to the parts which would tend to tilt them out of engagement, as no compressing strain is thrown upon the spring member.

As soon as any force acts in a direction normal to the base of the fastener parts the parts are readily disengaged by the action of the edge $g'$ of the wall of the socket part $c$, which slides along the surface of the spring projection and compresses it to a degree sufficient to permit the disengagement of the parts.

Any suitable means may be provided for securing the two parts of the fastener to the article or to the parts to be fastened by it. Holes may be made in the base of each of the members of the fastener, through which a thread may pass, so that the fastener may be held in place by sewing, or other obvious means may be employed.

The fastener members may be made of any convenient material and size and of as many parts in each part as desired, the main feature of my invention being the guard device, so located as to prevent the tilting of the two fastener members on each other and to so meet the strains tending to such result by what are practically rigid braces.

In the preferred form of the device, as shown in Fig. 4 of the drawings, there is an opening through the socket member c, and the spring projection f extends to some extent beyond the plane of the base of the socket member. This is a convenient form for some uses and is of advantage in enabling pressure to be applied to the projecting portion from the rear of the socket member for disengaging the two fastener members; but this feature is not essential to my invention.

What I claim as my invention, and desire to secure by Letters Patent, is—

1. In combination in a fastener, a socket member having an annular projection and means for engaging a projection on the complementary spring member, a spring member bearing a compressible projecting part and means for engaging the annular projection on the socket member, and an annular guard located on the spring member said guard having a wall surrounding and engaging the annular projection on the opposite member.

2. In combination in a fastener, a socket member having an annular projection with the outer edge inturned and having a groove or recess at the base of the projection, a spring member bearing a compressible projecting part having a recess at its base, and an annular guard which embraces the annular projection on the opposite body part and has its edge provided with an inturned projection adapted to fit into the groove or recess in the wall of the socket part.

3. In combination in a fastener, a socket member having an opening through its base and an annular projection, a spring member having a compressible projection extending beyond the base of the socket member when the parts are engaged, means for removably holding the spring projection in the annular projection, and a guard located on the spring member, said guard having a wall surrounding and engaging the annular projection on the opposite member.

SAMUEL B. DONCHIAN.

Witnesses:
 CHAS. L. BURDETT,
 ARTHUR B. JENKINS.